United States Patent [19]

Mertz

[11] Patent Number: 4,681,297
[45] Date of Patent: Jul. 21, 1987

[54] ADJUSTABLE PRESSURE REGULATING SOLENOID VALVE

[75] Inventor: Denny W. Mertz, St. Louis County, Mo.

[73] Assignee: Emerson Electric Co., St. Louis, Mo.

[21] Appl. No.: 729,305

[22] Filed: May 1, 1985

[51] Int. Cl.$^4$ ............................................. F16K 31/12
[52] U.S. Cl. .................................... 251/45; 137/524; 137/543.23; 137/599; 251/30.02
[58] Field of Search .................. 137/599, 543.23, 524; 251/30.02, 45

[56] References Cited

U.S. PATENT DOCUMENTS

| | | | |
|---|---|---|---|
| 2,873,760 | 2/1959 | Safford | 137/543.23 |
| 2,944,408 | 7/1960 | Willis | 137/599 |
| 3,099,999 | 8/1963 | Vismara | 137/543.23 |
| 3,103,338 | 9/1963 | Marmo | 251/45 |
| 3,572,372 | 3/1971 | Moore | 137/543.23 X |
| 4,262,695 | 4/1981 | Iizumi | 137/599 |
| 4,295,631 | 10/1981 | Allen | 251/45 X |
| 4,338,856 | 7/1982 | Smilges et al. | 137/599 X |
| 4,390,157 | 6/1983 | Meckstroth | 251/30.02 |
| 4,545,405 | 10/1985 | LaBelle | 137/524 |

Primary Examiner—Albert J. Makay
Assistant Examiner—Steven E. Warner
Attorney, Agent, or Firm—Polster, Polster and Lucchesi

[57] ABSTRACT

A pressure regulating solenoid valve is disclosed which comprises a valve body having a flow path therethrough having an inlet and an outlet. The valve body has a main valve seat within the flow path, and a main valve member mounted within the valve body for movement between an open position, in which the main valve member is clear of the main valve seat for the primary flow of fluid between the inlet and outlet, and a closed position in which the main valve member engages the main valve seat so as to block the primary flow of fluid through the main valve seat. A spring biased combination throttling valve/check valve is interposed within the flow path between the upstream and downstream sides of the main valve seat so as to permit a secondary flow of fluid from the inlet to the outlet of the valve housing when the main valve is closed and when the pressure differential of the flow through this secondary valve seat is above a predetermined value.

10 Claims, 5 Drawing Figures

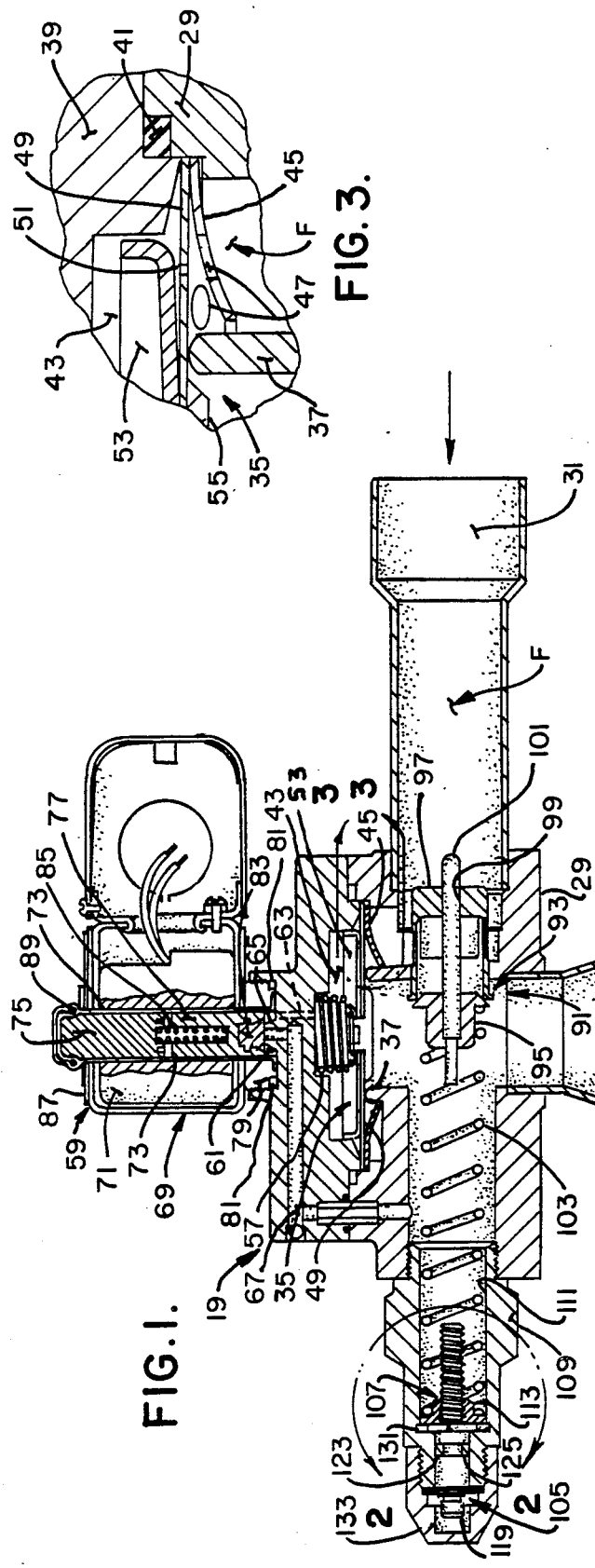
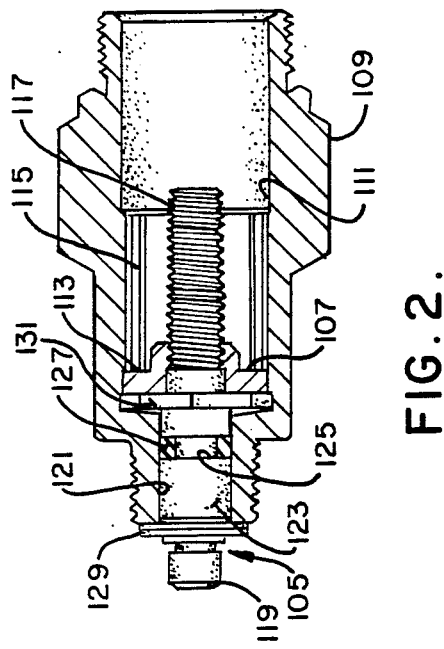

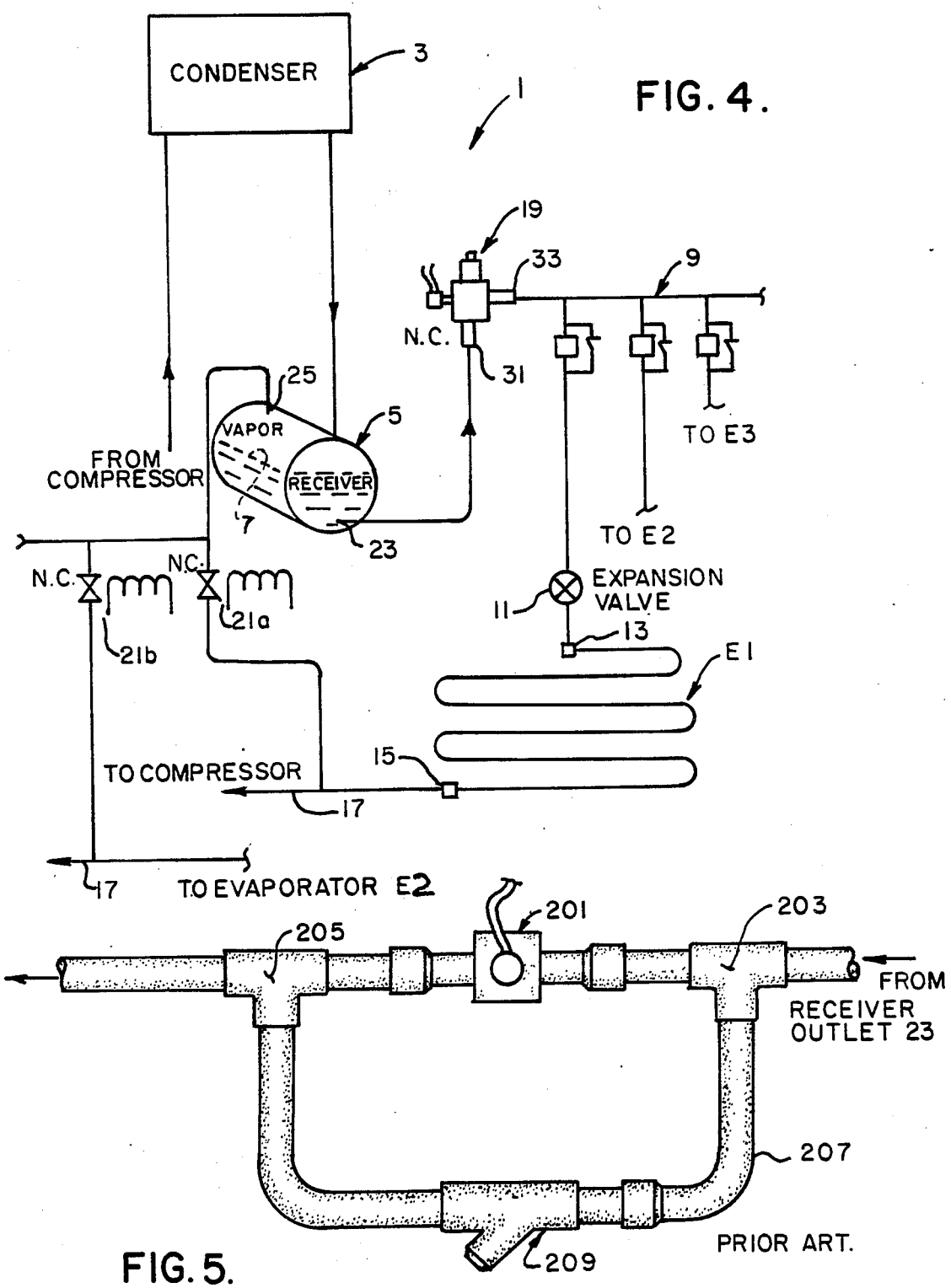

ADJUSTABLE PRESSURE REGULATING SOLENOID VALVE

BACKGROUND OF THE INVENTION

This invention relates to a pressure regulating valve, and more particularly to a pressure regulating, refrigerant solenoid valve, such as may be used in a large commercial, multi-evaporator refrigeration system. However, within the broader aspects of this invention, the pressure regulating solenoid valve of this invention may be utilized in other applications for controlling the flow of air, water, or other fluids.

In a large commercial refrigeration system, such as in a refrigeration system for food and meat display cases and in frozen food cases in a supermarket or the like, it is conventional to supply the evaporators in the various food display cases with refrigerant from a common compressor. Refrigerant compressed by the compressor is fed into a condensing unit, oftentimes located on the roof of the building, so as to convert the compressed refrigerant into a liquid at relatively high pressure. The condensed, high pressure liquid from the condenser is typically fed into a receiver containing both liquid and vapor refrigerant. Liquid refrigerant is withdrawn from the receiver and is fed, via a manifold system, to a multiplicity of evaporators located, for example, within individual food display cases for refrigerating or cooling respective zones within respective display or refrigeration cases. Typically, an expansion valve is provided upstream from the inlet to each of the evaporators so as to permit the adiabatic expansion of the refrigerant within the evaporator thereby to absorb heat from the refrigerated space served by that evaporator. In normal operation, the liquid refrigerant within the evaporator is evaporated and exits the outlet of the evaporator as a vapor for being returned to the suction side of the compressor. Oftentimes, the refrigerant discharge from the evaporator will be maintained at a predetermined superheat level so as to ensure that only vapor, and not liquid refrigerant, is returned to the compressor.

After an extended period of operation in its refrigerating mode, frost or ice will oftentimes build up on the exterior surfaces of the evaporator, thus decreasing the efficiency of heat transfer between the air within the refrigerated space and the evaporator. It is typical to initiate a defrost cycle for the refrigeration system so as to facilitate melting of the frost or ice built up on the outside of the evaporator. The manner in which a defrost cycle for one or more of the evaporators in the system is initiated may be understood by referring to FIGS. 4 and 5 of the drawings of the present disclosure. For example, in a prior art refrigeration system, in order to initiate a defrost cycle for an evaporator, a normally open solenoid valve 201, as shown in FIG. 5, is closed thereby to completely block the flow of liquid refrigerant through the solenoid valve 201. However, as can be seen in FIG. 5, a parallel branch 207 bypasses solenoid valve 201 and this bypass branch includes a combination one-way check valve and pressure regulating valve 209. This check and pressure regulating valve includes a spring biased valve member which is normally closed because when solenoid valve 201 is open, a very small pressure differential exists across solenoid valve 201. However, when solenoid valve 201 is closed, and when a pressure differential across check valve 209 in excess of a predetermined value, the check valve will open and allow a secondary or limited flow of refrigerant around the closed solenoid valve 201 so as to continue to supply liquid refrigerant from the receiver to at least certain of the evaporators in the multi-evaporator system.

Simultaneously with closing of the prior art normally open solenoid valve 201, a normally closed solenoid valve, as indicated at 21a, 21b in FIG. 4, is opened so as to permit vaporized refrigerant from within the receiver directed to the outlet or suction end of a selected evaporator. Since the vaporized refrigerant supplied to the suction end of the selected evaporator is at a higher pressure than the liquid refrigerant supplied to the inlet of the selected evaporator due to the above-noted pressure drop through the combination check valve and spring biased pressure regulating valve 209, vaporized refrigerant will be caused to flow in reverse direction through the selected evaporator. This will result in condensation of the vaporized refrigerant within the selected evaporator which in turn will give off heat, thus facilitating defrosting of the selected evaportor. The liquid refrigerant exhausted from the inlet end of the selected evaporator will then be combined with the liquid refrigerant in the manifold system which is continued to be supplied, albeit in reduced amounts, to the other evaporators within the system which are not undergoing their respective defrost cycles. In this manner, one or more evaporators within the system can selectively be operated in a defrost mode, while others of the evaporators within the system continue to work in their refrigerating mode. Once the selected evaporators have completed their defrost cycle, the normally closed solenoid valve 21 will be de-energized, thus blocking the flow of refrigerant vapor to the inlet end of the selected evaporator, and permitting that selected evaporator to again begin operating in its refrigerating mode. By opening other such normally closed solenoid operating valves, others of the evaporators of the refrigeration system may selectively undergo respective defrost cycles.

However, the prior art solenoid valve and combination check valve/pressure regulating valve, as generally shown in FIG. 5, required the provision of not only a solenoid operating valve to block the main flow, but required the provision of a bypass circuit 207, together with the combination check valve/regulating valve 209. The various lengths of tubing, fittings, and the like, together with the additional hardware, added substantially to the cost of the system. As a further drawback, in order to vary the lower pressure differential across the solenoid valve at which point the combination check valve/pressure regulating valve 209 would open, required disassembly of the combination check valve/pressure regulating valve so as to change the spring therein. This required that the entire refrigeration system be opened to the atmosphere with a consequent loss of refrigeration and further required recharging the refrigeration system with the refrigerant. Of course, in a large commercial refrigeration system, the requirement of having to release the refrigerant from the system and to recharge the system is highly disadvantageous. There has been a long-standing need in such systems to permit the ready adjustment of the range of pressure differentials at which point the combination check valve/pressure regulating valve, as shown in FIG. 5, would open, depending on the operating characteristics and parameters of a particular refrigeration system, and depending on the refrigeration loads imposed on various ones of the multiple evaporators constituting the refrigeration system.

SUMMARY OF THE INVENTION

Among the several objects and features of the present invention may be noted the provision of a combination adjustable pressure regulating solenoid valve which eliminates the need for separate normally opened solenoid blocking valve, a bypass circuit, and a separate check valve/pressure regulating valve;

The provision of such an adjustable pressure regulating solenoid valve which permits an operator to adjustably vary the lower predetermined pressure differential across the valve at which point the valve will open without having to open up the refrigeration system with a consequent loss of refrigerant;

The provision of such an adjustable pressure regulating solenoid valve which reduces the complexity of the refrigeration system and which reduces the number of joints in the refrigeration with a consequent reduction in the number of possible leak points within the refrigeration system;

The provision of such an adjustable pressure regulating solenoid valve which combines the function of two valves into a single unit; and The provision of such an adjustable pressure regulating solenoid valve which is of rugged and simple construction, which is readily adjustable during operation of the refrigeration system so as to optimize operation of a refrigeration system, which has a long service life, and which is of economical construction.

Briefly stated, an adjustable pressure regulating valve of the present invention comprises a valve body having a flow path therethrough, the latter having an inlet and an outlet. The valve body has a main valve seat therewithin, and a main valve member mounted within the valve body for movement between an open position in which the main valve member is clear of the main valve seat for the main or primary flow of fluid between the inlet and outlet, and a closed position in which the main valve member engages the main valve seat so as to block the primary flow of fluid. Means is provided for permitting a secondary flow of fluid from the inlet to the outlet when the pressure differential between the inlet and outlet exceeds a predetermined lower value.

Other objects and features of the present invention will be in part apparent and in part pointed out hereinafter.

BRIEF DESCRIPTION OF THE DRAWINGS

FIG. 1 is a vertical cross sectional view of a pressure regulating solenoid valve of the present invention, showing the main valve and a secondary or pressure modulating valve thereof in their respective closed positions;

FIG. 2 is a view, taken along line 2—2 of FIG. 1, showing a portion of the valve on a somewhat enlarged scale;

FIG. 3 is a view, taken along line 3—3 of FIG. 1, showing another portion of the valve in enlarged scale;

FIG. 4 is a semi-diagrammatic view of the pressure regulating valve of the present invention, installed within a multiple evaporator refrigeration system; and FIG. 5 is a view of a portion of the refrigeration system show in FIG. 4, utilizing a prior art solenoid valve and combination check valve/pressure regulating valve in place of the valve of the present invention.

Corresponding reference characters indicate corresponding parts throughout the several views of the drawings.

DESCRIPTION OF A PREFERRED EMBODIMENT

Referring now to the drawings, and more particularly to FIG. 4, a multiple evaporator refrigeration system is shown in its entirety by reference character 1. Such a refrigeration system may, for example, be a large commercial installation in a supermarket or the like for supplying refrigerant to a number of food display cases or food freezer units. The refrigerant for these food display or freezer cases is supplied from a large compressor (not shown). The refrigerant from the compressor is directed to a condenser 3 which may, for example, be a water-cooled rooftop unit. The high pressure refrigerant is condensed into a high pressure liquid within condenser 3 and is then directed into a receiver 5. Both refrigerant vapor and liquid are present in the receiver 5, with a vapor/liquid level 7 of predetermined depth being normally disposed within receiver 5. Liquid refrigerant from receiver 5 is fed into a manifold system 9, which in turn supplies liquid refrigerant to a multiplicity of evaporators $E1-E_n$, with each of these evaporators being in a respective refrigerated space, such as a refrigerated food or freezer case, or a portion thereof. An expansion valve 11 is provided for each of the evaporators, and each of the evaporators has an inlet 13 and a suction outlet 15. As is typical, the high pressure liquid refrigerant is permitted to expand adiabatically as it flows through expansion valve 11 such that the liquid refrigerant evaporates within its evaporator and draws heat into the refrigerant from the surroundings, thus chilling or refrigerating the refrigerated space served by the evaporator. Typically, the evaporator is sized relative to the flow rate of liquid refrigerant through expansion valve 11 so as to ensure that all of the refrigerant passing through the evaporator is evaporated and transformed into a vapor such that only vaporized refrigerant is returned to the compressor via a suction line 17. Of course, the compressor receives the low pressure refrigerant vapor from the evaporators, compresses it, and returns it to condenser 3.

As is typical, frost or ice oftentimes forms on the exterior of each of the evaporators $E1-E_n$, such that it is necessary to periodically remove the frost or ice from the evaporator so as to ensure a more efficient operation of the refrigerator system. Typically, this ice or frost is removed by initiating a so-called defrost mode of operation of refrigeration system 1. In accordance with this invention, a normally closed solenoid operated valve 19 is provided between receiver 5 and manifold 9 so that upon selective operation of this valve, the main or primary flow of liquid refrigerant to manifold system 9 and hence to evaporators $E1-E_n$ is blocked, and further for initiating a secondary flow of liquid refrigerant to manifold assembly 9 so as to maintain a desired pressure drop across the valve 19, or so as to maintain the pressure of the liquid refrigerant in manifold assembly 9 above a predetermined minimum pressure level. In conjunction with de-actuating valve 19 as above-described, one or more normally closed solenoid valves 21a, 21b, . . . are opened. It will be noted that liquid refrigerant supplied from a liquid refrigerant outlet in receiver 3 is supplied to the inlet of valve 19, and it will be further noted that vaporized refrigerant from receiver 5 is supplied to the inlet of the normally closed solenoid operated valve 21 from a vapor outlet within receiver 5. It will also be appreciated that the pressure of the vapor and the liquid refrigerant within receiver 5 is substantially at the same pressure.

With the normally closed valve 19 of the present invention de-actuated so as to close the primary flow of refrigerant thereto, and with the pressure drop across valve 19 being above a predetermined pressure level, a secondary flow of refrigerant at a predetermined pressure drop across valve 19 will be established in a manner as will hereinafter appear so as to supply liquid refrigerant from receiver outlet 23 to manifold assembly 9. In this manner, it will be understood that the evaporators not undergoing a defrost cycle will continue to be supplied with liquid refrigerant and will be maintained in their refrigerating or cooling mode while one or more of the other evaporators is undergoing its defrost cycle. With a first normally closed solenoid valve 21a open, refrigerant vapor from vapor outlet 25 of receiver 5 is permitted to flow into suction line 17, and is further introduced into the outlet or suction end 15 of a selected evaporator, such as evaporator E1, as shown in FIG. 4. In this manner, vaporized refrigerant, at a pressure higher than the pressure of the liquid refrigerant within manifold 9, is introduced into the suction end 15 of evaporator E1, and is permitted to flow in reverse direction through evaporator E1 and through the respective expansion valve 11 for evaporator E1. As the vaporized refrigerant flows in reverse direction through evaporator E1, the frost or ice on the exterior of evaporator E1 is caused to melt, and the vaporized refrigerant is caused to condense into a liquid. The condensed refrigerant within the evaporator is then forced in reverse direction back through a respective expansion valve, and since the liquid refrigerant in manifold assembly 9 is at a pressure level of less than the vaporized refrigerant flowing in reverse direction through the evaporator E1, the condensed vaporized refrigerant will be combined with the liquid refrigerant within manifold assembly 9, which is at a lower pressure due to the pressure drop across valve 19. After a predetermined length of time sufficient to complete the defrost cycle of evaporator E1, the selected solenoid valve 21a will be de-energized so as to block the flow of vaporized refrigerant from receiver 5 to evaporator E1, and another normally closed solenoid valve, such as valve 21b, may be energized so as to initiate a similar defrost cycle for another evaporator, such as evaporator E2. Upon closing of valve 21a, flow of liquid refrigerant from manifold assembly 9 to evaporator E1 will be re-established such that evaporator E1 will be operated in its refrigeration mode. This cycle can be repeated until all of the evaporators in refrigeration system 1 have undergone a defrost cycle.

More particularly, the adjustable pressure regulating solenoid valve 19 of the present invention, as shown in greater detail in FIGS. 1-3, is shown to comprise a valve body or housing 29 having a flow path F therethrough from an inlet 31, which is adapted to be connected to liquid outlet 23 of receiver 5, and an outlet 33, which is adapted to be connected to manifold assembly 9. A main valve, as indicated generally at 35, is provided in valve housing 29. The main valve is constituted by a main valve seat 37 within flow path F. The main valve 35 is selectively movable between a closed position (as shown in FIGS. 1 and 3), in which the main valve 35 is in sealing engagement with main valve seat 37 thereby to block the main flow of refrigerant from inlet 31 to outlet 33, and an open position (not shown), in which main valve 35 is clear of main valve seat 37 thereby to permit the primary flow of fluid between the inlet and the outlet.

Value 19 further includes an upper housing portion 39 adapted to be bolted or otherwise secured to housing 29, and having a seal 41 between the upper housing portion 39 and the lower housing portion 29. A chamber, as indicated at 43, is provided in upper housing 39 so as to at least in part receive main valve 35 as the latter is moved from its closed position to its open position.

Main valve 35 is a diaphragm actuated valve, including an annular disk 45, staked or otherwise secured in place within housing 29 and surrounding main valve seat 37. Annular disk 45 has a series of openings 47 therein permitting fluid to flow freely from inlet 31 through the annular disk and through main valve seat 37 when the main valve member 35 is in its open position. Main valve 35 further includes a flexible diaphragm 49 sealably secured between valve housing 29 and the upper housing portion 39. A weep hole 51, as best shown in FIG. 3, is provided in diaphragm 49 such that fluid on the upstream side of main valve seat 37 is in communication with chamber 43, and such that the upstream fluid pressure acts against both sides of diaphragm 49 radially outwardly beyond main valve seat 37, and on the central portion of the diaphragm on the upstream side thereof (i.e., the side of the diaphragm facing chamber 43) when the main valve is in its closed position (as shown in FIG. 1). With the pressure within flow path F downstream from main valve seat 37 less than the inlet fluid pressure of the flow path, pressure forces within chamber 43 act to positively hold the main valve member 35 in its closed position. A diaphragm support dish 53 is disposed on the upstream face of diaphragm 49. An enlarged head rivet support member 55 is disposed on the downstream face of diaphragm 49 and locks diaphragm support dish 53 to the upstream face of the diaphragm and, further, the enlarged head of the rivet support 55 supports the downstream face of the diaphragm within main valve seat 37 when the main valve member is closed. A compression coil spring 57 is interposed between upper housing portion 39 and diaphragm support dish 53 so as to bias main valve member 35 toward its closed position.

As generally indicated at 59, a selectively operable pilot valve is provided for selectively relieving fluid pressure from within chamber 43 thereby to permit fluid pressure from inlet 31 acting on the upstream face of diaphragm 49 disposed radially outwardly of main valve seat 37, together with any fluid pressure within flow path F downstream from main valve seat 37, to act on the main valve member and to move the main valve member against the bias of spring 57 from its closed to its open position. Selectively operable pilot valve 59 includes a pilot chamber 61 in the upper portion of upper housing 39. A pilot port 63 is provided in upper housing portion 39 so as to provide communication between diaphragm chamber 43 and pilot chamber 61 such that any fluid pressure within chamber 43 is also in communication with pilot chamber 61. A pilot valve seat 65 is provided within pilot chamber 61, and a pilot discharge port 67 is provided within upper housing 39 for communication between pilot chamber 61 and flow path F downstream from main valve seat 37.

More specifically, the selectively operable pilot valve 59 is shown to be a solenoid actuated pilot valve 69, having a solenoid coil 71 surrounding a closed end tube 73. A fixed armature or core 75 is disposed within the upper end of tube 73, and an axially movable armature or core member is disposed within the lower portion of tube 73. A nut 79 engages the lower end of tube 73 and seals the lower end of the tube with respect to the portion of upper housing 39 defining pilot chamber 61. An elastomeric seal 81 is provided so as to positively seal nut 79 and tube 73 relative to the upper housing portion 39. It will be appreciated that with tube 73 so sealably secured to upper housing portion 39, fluid pressure within pilot chamber 61 will surround movable core or valve member 77.

An elastomeric valve member 83 is carried on the lower end of movable valve member 77 so as to be sealably engagable with pilot valve seat 65 for closing off pilot relief port 67, and for maintaining fluid pressure within pilot valve chamber 61 and within diaphragm chamber 43. With the pilot valve member 77 in its above-stated closed position, fluid pressure will be maintained within diaphragm chamber 43, and this fluid pressure will positively maintain main valve 35 in its closed position. A compression coil spring 85 is disposed between fixed armature 75 and movable valve member 77 so as to resiliently bias the movable valve member toward its closed position in sealing engagement with pilot valve seat 65. A space is provided between the movable valve member 77 and the end of the fixed armature 75 when the movable valve member is in its closed position so that upon energization of solenoid coil 71, the magnetic flux of coil 71 will tend to retract movable valve member 77 axially into the coil and to thus move elastomeric valve member 83 clear of pilot valve seat 65 thereby to open communication between pilot valve chamber 61 and the portion of flow path F downstream from main valve seat 37 via pilot relief port 67. Solenoid coil 71 is enclosed within a coil housing 87. The coil 71 and coil housing 87 are positively retained on tube 77 by means of a retainer clip 89 releasably secured to the upper or outer end of the closed tube 73.

Further, valve 19 of the present invention includes a combination check valve and pressure differential modulating valve therewithin, as generally indicated at 91, so as to permit a secondary flow of liquid refrigerant from inlet 31 to outlet 33 when main valve 35 is in its closed position, and when a pressure differential in excess of a minimum predetermined value is present between inlet 31 and outlet 33. This combination check valve and pressure differential valve comprises a secondary valve seat 93 providing communication between a portion of flow path F upstream from main valve seat 37, and another portion of the flow path downstream from main valve seat 37. A secondary poppet valve member 95 is movable between a closed position (as shown in FIG. 1) in which the secondary valve member 95 sealably engages second valve seat 93 thereby to block the above-mentioned secondary flow of fluid, and an open position (not shown) in which the secondary valve 95 is clear of the secondary valve seat 93 so as to permit the above-stated secondary flow of refrigerant.

Secondary valve seat 93 is constituted by a valve seat body 97 provided within valve housing 29, with this secondary valve seat body has a spider frame having a plurality of openings (not shown) therein to permit the flow of fluid from inlet 31 to outlet 33 when secondary valve member 95 is in its open position. The secondary valve seat spider body 97 has a central bore 99 therethrough receiving an axial guide pin 101 carried by secondary valve member 95. Guide pin 101 is slidably received within central bore 99, and thus the guide pin keeps secondary valve member 95 axially aligned with secondary valve seat 93 as the secondary valve member moves between its opened and closed positions. A compression coil spring 103 is interposed between secondary valve member 95 and means, as generally indicated at 105, is provided for manually adjusting the compression of spring 103 thereby to permit adjustment of valve 91 so as to vary the difference in pressure between inlet 31 and outlet 33 at which point fluid pressure on the upstream face of valve member 95 overcomes the bias of spring 103 and causes valve member 95 to move from its closed position toward its opened position thereby initiating the above-stated secondary flow of refrigerant through valve 19.

Adjusting means 105 comprises a so-called non-rising actuator 107 for selectively compressing or releasing spring 103 thereby to vary the minimum predetermined pressure difference between inlet 31 and outlet 33 at which valve 95 will be moved from its closed position toward its open position. This non-rising actuator assembly 107 includes an actuator body 109 which is sealably secured (e.g., threaded) into a respective opening in valve body 29. The actuator body 109 has a bore 111 therewithin. A hexagonal nut 113 is received within bore 111 and the portions of actuator body 109 constituting bore 111 have six longitudinal grooves 115 formed therein for receiving the corners of hexagonal nut 113 so as to permit axial movement of nut 113 within bore 111 so as to prevent rotation of the nut. Further, actuator assembly 107 includes a threaded shaft 117 which threadably engages hexagonal nut 113. The threaded shaft 117 has a head 119 on the exterior of actuator body 109. Actuator body 109 has a bore 121 therewithin which receives a shank portion 123 of threaded actuator 107 between threaded shaft 117 and head 119. This shank portion has a circumferential groove 125 therewithin which receives an elastomeric seal 127 for positively sealing threaded actuator member 107 relative to actuator body 109 thereby to prevent leakage of refrigerant from flow path F and yet so as to permit rotation of actuator 107. A retainer clip 129 secures actuator 117 relative to actuator body 109 and prevents axial inward movement of the actuator relative to actuator body 109. Shank 123 has a shoulder 131 thereon which engages the end of bore 111 in body 109 to prevent outward axial movement of acutator 117. As noted above, actuator 107 is non-rising in that as the head 119 and shaft 117 are selectively rotatated to effect adjustment of spring 103, head 119 and shaft 117 does not move in axial direction with respect to body 109. A removable cap, as shown in FIG. 1, may be threaded onto the end of body 109 so as to enclose and protect head 119.

In operation, with all of the evaporators E1–$E_n$ operating in their refrigeration mode, solenoid coil 71 is energized such that solenoid valve member 77 is in its raised or open position, thus venting fluid pressure from within pilot valve chamber 61 and from within diaphragm chamber 43. With pilot valve member 77 open, pilot port 67 is sized relative to weep port 51 in diaphragm 49 so that fluid is vented from diaphragm chamber 43 at a rate much faster than it can flow into the diaphragm chamber via the weep port. This, in turn, causes fluid pressure within flow path F to overcome the bias of diaphragm spring 57 and to maintain the main diaphragm valve 35 in its open position clear of main valve seat 37, and so as to permit the primary flow of refrigerant through main valve seat 37 to outlet 31. In its fully opened position, valve 19 of the present invention imposes only a relatively small pressure drop between inlet 31 and outlet 33. This pressure drop is not sufficient for the fluid pressure on the upstream side of secondary valve 95 to overcome the bias of secondary valve spring 103, and thus the secondary valve is positively maintained in its closed position, as shown in FIG. 1, by spring 103.

Upon initiation of a defrost cycle of one or more of the evaporators, generally as heretofore described, solenoid coil 71 will be de-energized such that pilot valve member 77 will move from its opened position to its closed position (as shown in FIG. 1) under the bias of spring 85 such that communication between pilot chamber 61 and the portion of flow path F downstream from main valve seat 37 is blocked thereby allowing fluid pressure to build up within diaphragm chamber 43 via weep port 51 in diaphragm 49, and so as to increase the fluid pressure within the diaphragm and within pilot chamber 61. In this manner, fluid pressure acting on the upper face of diaphragm 49, together with the bias of diaphragm spring 57, causes the main valve member 35 to move from its opened to its closed position into sealing engagement with main valve seat 37. Thus, the primary flow of refrigerant through flow path F is blocked. Upon the pressure differential between inlet 31 and outlet 33 exceeding a predetermined minimum value (typically ranging between about 8–40 psi), as determined by the adjustment of spring 103, the higher upstream pressure in the portion of flow path F in communication with inlet 31 overcomes the bias of spring 103 and moves the secondary poppet valve member 95 from its closed position to an open position in which the secondary valve 95 is clear of the secondary valve seat 93. In this manner, a secondary flow of refrigerant from inlet 31 to outlet 33 is established, and a predetermined minimum value of the pressure differential between inlet 31 and outlet 33 will be maintained or modulated by secondary valve member 95 being biased toward its closed position by spring 103 and being forced toward its open position by the above-noted fluid pressure differential. This secondary flow of refrigerant through valve seat 93 when secondary valve 95 is at least partially opened is sufficient to supply liquid refrigerant to at least certain of the evaporators $E1-E_n$ in refrigeration system 1 which are not undergoing a defrost cycle. It will thus be appreciated that the adjustable secondary valve 95 and the adjustment means 105 constitute a modulating valve for regulating the secondary flow of refrigerant through secondary valve seat 93 and so as to maintain a desired pressure drop across valve 19. When the pressure differential between inlet 31 and outlet 33 of valve 19 is below a minimum predetermined value, spring 103 will maintain secondary valve member 95 in its closed position in engagement with secondary valve seat 93 thereby causing the secondary valve 95 to also act as a check valve blocking the flow of refrigerant in either direction through secondary valve seat 93.

Turning to FIG. 5, a portion of the refrigeration system 1 shown in FIG. 4 is depicted in which a prior art normally opened solenoid blocking valve 201 is provided in the main refrigerant supply line between liquid receiver outlet 23 and manifold assembly 9. An upstream tee is provided in the refrigerant line, and another tee 205 is provided downstream of solenoid valve 201. A bypass circuit 207 is interconnected between the upstream and downstream tee members around solenoid valve 201, and a combination spring biased check valve and pressure regulating valve 209 is installed within this bypass circuit. In operation, solenoid valve 201 is normally open, thus allowing refrigerant to freely flow therethrough. In such cases, the pressure differential across check valve 209 is insufficient to open check valve, and thus no flow of refrigerant occurs through bypass 207. However, upon initiation of a defrost cycle, as heretofore described, by energizing one of the normally closed solenoid valves 21a or 21b and by closing solenoid valve 201, liquid refrigerant from receiver outlet 23 is directed to check valve 209 via the bypass line 207. If the pressure differential across check valve 209 exceeds a predetermined level, the check valve will open and permit a secondary flow of refrigerant around the now closed solenoid valve 201. While this prior art system worked well for its intended purpose, it was not possible to readily adjust the pressure differential at which valve 209 opened. Typically, in order to adjust the pressure differential at which point valve 209 would open, it was necessary to open the refrigeration system and to change a spring within valve 209. Of course, the necessity of having to open the refrigeration system to change the spring resulted in a substantial loss of refrigerant. This necessitated recharging the refrigeration system and this procedure required considerable labor and was expensive. It will also be noted that the provision of the upstream and downstream tees 203 and 205, together with the bypass line 207, added both to the complexity and to the cost of the refrigeration system.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A pressure regulating valve comprising a valve body having a flow path therethrough, the latter having an inlet and an outlet, said valve body having a main valve seat within said flow path and a main valve member mounted within said valve body for movement between an open position in which said main valve member is clear of said main valve seat for the primary flow of fluid between said inlet and said outlet and a closed position in which said main valve member engages said main valve seat so as to block the primary flow of said fluid, and means for permitting a secondary flow of fluid from said inlet to said outlet when said main valve member is in its closed position and when the pressure differential between said inlet and said outlet exceeds a predetermined value said flow and pressure differential means comprising a secondary valve seat in communication with said flow path upstream and downstream from said main valve seat, and a secondary valve member movable between a closed position in which it sealingly engages said secondary valve seat thereby to block the flow of fluid between said inlet and said outlet via said secondary valve seat, and an open position in which said secondary valve member is clear of said secondary valve seat thereby to permit said secondary flow of said fluid between said inlet and said outlet via said secondary valve seat.

2. A valve as set forth in claim 1 further comprising a spring for biasing said secondary valve member toward its closed position with sufficient force such that if said pressure differential is less than said predetermined value, said secondary valve member remains closed, and such that if said pressure differential is greater than said predetermined value, said secondary valve is moved from its closed position toward its open position.

3. A valve as set forth in claim 2 further comprising means adjustably operable exteriorly of said valve for selectively varying said predetermined value of said pressure differential at which said secondary valve is moved from its closed position.

4. A valve as set forth in claim 3 wherein said spring is a compression coil spring interposed between said secondary valve member and said adjustment means, the latter being sealed with respect to said valve body and being adjustably movable from the exterior of said valve housing so as to compress or relax said spring.

5. A valve as set forth in claim 4 wherein said adjustment means comprises an abutment within said housing movable toward and away from said secondary valve seat, and rotary threaded non-rising means sealed with respect to said valve body and extending exteriorly of said valve body for effecting movement of said abutment toward and away from said secondary valve seat upon rotating said threaded means in one direction or the other, said abutment engaging one end of said spring.

6. A valve as set forth in claim 4 further comprising means for sealing said adjustment means relative to said housing and for permitting rotation of said adjustment means from the exterior of said valve body.

7. A pressure regulating valve comprising a valve body having a flow path therethrough, the latter having an inlet and an outlet, said valve body having a main valve seat within said flow path and main valve means mounted within said valve body for movement between an open position in which said main valve means is clear of said main valve seat thereby to permit the primary flow of fluid through said flow path, and a closed position in which said main valve means sealably engages said main valve seat thereby to block said primary flow of fluid through said flow path, said valve body further having a chamber therewithin in which said main valve means is received as it moves between its closed and opened positions, a fluid supply passage for communication between said flow path upstream from said main valve seat and said chamber for supplying pressurized fluid to said chamber, fluid pressure within said chamber acting to hold said main valve means in one of its stated positions, a pilot passsage for communication between said chamber and said flow path downstream from said main valve seat, said pilot passage including a pilot valve seat, a pilot valve member movable relative to said pilot valve seat between an open position in which said pilot valve member permits the flow of fluid from said chamber via said pilot passage to said flow path downstream from said main valve seat, and a closed position in which said pilot valve member is in sealing engagement with said pilot valve seat thereby to block the flow of fluid from said chamber, selectively actuable means for effecting movement of said pilot valve between its said opened and closed positions so that with said pilot valve opened, said fluid pressure within said chamber is less than the fluid pressure within said flow path downstream from said main valve seat thereby to maintain said main valve means in one of its said positions and so that with said pilot valve member closed, fluid pressure within said chamber increases so as to positively hold said main valve means in the other of its said positions, and means for permitting a secondary flow of said fluid from said inlet to said outlet when said main valve is closed and when the pressure differential between said inlet and said outlet exceeds a predetermined value.

8. A valve as set forth in claim 7 further comprising a spring for biasing said secondary valve member toward its closed position, said spring biasing said secondary valve member toward its closed position with sufficient force such that if said pressure differential is less than said predetermined value, said secondary valve member is closed, and such that if said pressure differential is greater than said predetermined value, said secondary valve is moved from its closed position toward its open position.

9. A valve as set forth in claim 7 wherein said flow and pressure differential means comprises a secondary valve seat in communication with said flow path upstream and downstream from said main valve seat, and a secondary valve member movable between a closed position in which it sealingly engages said secondary valve seat thereby to block the flow of fluid between said inlet and said outlet via said secondary valve seat, and an opened position in which said secondary valve member is clear of said secondary valve seat thereby to permit said secondary flow of said fluid between said inlet and said outlet via said secondary valve seat.

10. A valve as set forth in claim 9 further comprising means adjustably operable exteriorly of said valve for selectively varying said predetermined value of said pressure differential at which said secondary valve is opened.

* * * * *

UNITED STATES PATENT AND TRADEMARK OFFICE
CERTIFICATE OF CORRECTION

PATENT NO. : 4,681,297
DATED : July 21, 1987
INVENTOR(S) : Denny W. Mertz

It is certified that error appears in the above-identified patent and that said Letters Patent is hereby corrected as shown below:

Column 2, line 6, "21a, 21b" should read --21a, 21b....--

Column 6, line 5, "Value" should read -- Valve --

Signed and Sealed this

Twelfth Day of April, 1988

Attest:

DONALD J. QUIGG

Attesting Officer

Commissioner of Patents and Trademarks